United States Patent [19]

Hwa et al.

[11] B 3,993,715

[45] Nov. 23, 1976

[54] PROCESS FOR FORMING FIRE RETARDANT POLYMERS OF BIS (HYDROCARBYL) VINYLPHOSPHONATE

[75] Inventors: Jesse C. H. Hwa, Stamford, Conn.; Paul Kraft, Spring Valley, N.Y.

[73] Assignee: Stauffer Chemical Company, Westport, Conn.

[22] Filed: Apr. 1, 1974

[21] Appl. No.: 456,579

[44] Published under the second Trial Voluntary Protest Program on February 10, 1976 as document No. B 456,579.

[52] U.S. Cl. ............................. 260/884; 526/278; 526/291; 526/296; 260/881; 260/885; 260/886; 526/345.
[51] Int. Cl.$^2$ .................. C08L 27/06; C08L 27/08; C08L 27/10
[58] Field of Search ............ 260/884, 875, 881, 886

[56] References Cited
UNITED STATES PATENTS

| | | | |
|---|---|---|---|
| 3,583,956 | 6/1971 | Pointer et al. | 204/159.17 |
| 3,691,127 | 9/1972 | Kraft et al. | 260/884 |
| 3,726,839 | 4/1973 | Jin | 260/884 |
| 3,798,287 | 3/1974 | Murayama et al. | 260/878 R |
| 3,800,007 | 3/1974 | Bafford | 260/877 |

*Primary Examiner*—Murray Tillman
*Assistant Examiner*—Thurman K. Page
*Attorney, Agent, or Firm*—Richard P. Fennelly

[57] ABSTRACT

There is disclosed a process for forming modified polymers of: (1) a bis(hydrocarbyl) vinylphosphonate; (2) optionally, a crosslinking monomer containing two or more ethylenically unsaturated bonds; and (3) optionally, one or more comonomers which contain one ethylenically unsaturated bond. The products formed by this process which contain any of the above mentioned monomers are substantially free of unreacted residual bis(hydrocarbyl) vinylphosphonate. The process comprises the post-addition of a monoethylenically unsaturated monomer, the monomer being selected from the group consisting of the vinyl and vinylidene chlorides and bromides and the $C_1$–$C_{20}$ dialkyl esters of maleic and fumaric acids, to the polymerization medium containing the vinylphosphonate and any optional monomers after the percent conversion of monomers in the polymerization medium has exceeded about 40%.

15 Claims, No Drawings

PROCESS FOR FORMING FIRE RETARDANT POLYMERS OF BIS (HYDROCARBYL) VINYLPHOSPHONATE

BACKGROUND OF THE INVENTION

Bis(hydrocarbyl) vinylphosphonates are sluggish monomers which are difficult to homopolymerize and copolymerize. Generally, a certain amount of residual, unreacted, oily vinylphosphonate will be present when such polymerizations are attempted. Since the vinylphosphonate reagent is relatively expensive, this amount of unreacted phosphonate results in a rather expensive and undesired waste of starting material. A need therefore exists for a process which will drive the conversion rate higher and produce a final product which is substantially free of unreacted, residual bis (hydrocarbyl) vinylphosphonate.

TECHNICAL DISCLOSURE OF THE INVENTION

It has now been found that the conversion rate discussed above can be substantially increased by the post addition of a monomer containing one ethylenically unsaturated bond after the % conversion of the basic polymerization recipe containing the vinylphosphonate has exceeded about 40%. The post addition of this "chaser" monomer removes the residual, unreacted vinylphosphonate which would normally remain unreacted if the chaser were not used.

The basic polymerization recipe used in this process can comprise from, about 3–100% by weight, preferably from 3–98%, by weight, of a bis(hydrocarbyl) vinylphosphonate, about 0–60% by weight, preferably 2–60%, of at least one crosslinking monomer containing at least two ethylenically unsaturated bonds, and about 0–90% by weight of one or more monomers containing at least one ethylenically unsaturated bond. Particularly preferred ranges for these components are 20–80% by weight, 5–20% by weight and 20–60% by weight, respectively.

The vinylphosphonate has the following structure:

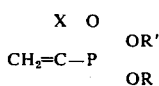

wherein X is selected from the group consisting of hydrogen, halogen, cyano, aryl such as phenyl, haloaryl, $C_1$–$C_{18}$ alkyl, $C_1$–$C_{18}$ haloalkyl and

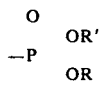

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The use, in this disclosure, of the expression "hydrocarbyl" and "substituted hydrocarbyl groups" refers to the radicals obtained upon the removal of a hydrogen from a hydrocarbon or substituted hydrocarbon group which may be either a aliphatic or aromatic group. These hydrocarbyl groups may be substituted with any non-interfering groups, i.e. with any group which does not interfere with the polymerization of the bis(hydrocarbyl vinylphosphonate. Such substituent groups include, for example, chloro, bromo, fluoro, nitro, hydroxy, sulfone, ethoxy, methoxy, nitrile, ether, ester and keto groups and the like.

Illustrative of the groups represented by R and R' are alkyl or alkenyl groups, such as methyl, ethyl, propyl, butyl, pentyl, hexyl, nonyl, pentenyl and hexenyl groups and all of their respective isomers; cycloalkyl or cycloalkenyl groups, such as cyclopropyl, cyclobutyl, cyclopentyl, cyclohexyl and cyclohexenyl grups and the like; while typical aryl groups represented by R and R' include phenyl, benzyl, phenethyl, tolyl and naphthyl groups and the like.

Representative of the above depicted bis(hydrocarbyl) vinylphosphonates are:
  Bis(beta-chloroethyl) vinylphosphonate;
  Bis(beta-chloropropyl) vinylphosphonate;
  Bis(beta-chloroethyl) 1-methylvinylphosphonate;
  Bis(beta-chloroethyl) 1-cyanovinylphosphonate;
  Bis(beta-chloroethyl) 1-chlorovinylphosphonate;
  Bis(beta-chloroethyl) 1-phenylvinylphosphonate;
  Dimethyl vinylphosphonate;
  Diethyl vinylphosphonate;
  Bis(omega-chlorobutyl) vinylphosphonate;
  Di-n-butyl vinylphosphonate;
  Di-isobutyl vinylphosphonate;
  Bis(2-chloroisopropyl) 1-methylvinylphosphonate;
  Diphenyl vinylphosphonate; and
  Bis(2,3-dibromopropyl) vinylphosphonate.

From the above group of bis(hydrocarbyl) vinylphosphonate monomers, it is preferred to employ bis(beta-chloroethyl) vinylphosphonate in preparing the polymers of this invention since the latter monomer is a commercially available material and lower in cost than any of the other bis(hydrocarbyl) vinylphosphonates.

The second, and optional, component in the basic polymerization recipe is a crosslinking monomer containing two or more polymerizable, ethylenically unsaturated bonds. Suitable monomers include allyl methacrylate, divinyl benzene, diethylene glycol dimethacrylate, ethylene glycol dimethacrylate, trimethylolpropane trimethacrylate, methylene-bis-acrylamide, diethylene glycol diacrylate, ethylene glycol diacrylate, divinyl ether, diallyl fumarate, diallyl phthalate, divinyl sulfone, divinyl carbitol, butylene dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol and diallyl phosphonates. Optimum results are, however, obtained by the use of allyl methacrylate since its use leads to a greater degree of conversion of the vinylphosphonate monomer than obtainable using the other crosslinking monomers.

The third, and optional, component of the basic polymerization recipe is one or more monomers containing only one ethylenically unsaturated group. These monomers include the vinyl halides such as vinyl chloride, vinyl bromide, vinyl fluoride, and trifluoroethylene, vinylidene halides such as vinylidene chloride, vinylidene bromide and vinylidene fluoride; alpha-olefins such as ethylene, propylene and butylene; vinyl esters of carboxylic acids such as vinyl acetate, vinyl butyrate, and vinyl stearate; the $C_1$–$C_{20}$ alkyl esters of acrylic and methacrylic acid such as methyl methacrylate, methyl acrylate, ethyl acrylate, butyl acrylate, 2-ethylhexyl acrylate, and lauryl acrylate, aryl, halo- and nitro-substituted benzyl esters of acrylic and methacrylic acis such as benzyl acrylate and 2-chlorobenzyl acrylate; ethylenically unsaturated monocarboxylic-acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide anad methacrylamide, vinyl aryl compounds such as styrene and alpha-methyl styrene; nitriles of ethylenically unsaturated carboxylic acids such as acrylonitrile and methacrylonitrile; and, $C_1$–$C_{20}$ alkyl vinyl ethers such as methyl vinyl ether, ethyl vinyl ether and stearyl vinyl ether. Preferred for use as optional comonomers are the vinyl halides particularly vinyl chloride; the vinylidene halides, particularly vinylidene chloride; the vinyl aryl compounds particularly styrene and the lower alkyl esters of acrylic and methacrylic acids.

The basic polymerization step may be performed by means of any convenient free radical initiated polymerization technique known to those skilled in the art including such procedures as suspension, emulsion and solution polymerization.

In a suspension polymerization technique the reaction is conducted in an aqueous medium containing from about 0.01 to 5%, as based on the total weight of the monomer charge of a suspension agent such, for example, as gelatin, starch, hydroxy-methyl cellulose, hydroxyethyl cellulose, hydroxypropyl cellulose, carboxymethyl cellulose, talc, clay, polyvinyl alcohol and the like. As a catalyst for the polymerization, one may use from about 0.05 to 5%, as based on the total weight of the monomer charge, of a monomer soluble azo or peroxide catalyst such, for example, as azobisisobutyronitrile, lauroyl peroxide, benzoyl peroxide, isopropylperoxy dicarbonate, t-butyl peroxypivalate, and the like. Polymerization may ordinarily be initiated by heating the system to a temperature in the range of from about 20° to 150°C. for a period of from about 5 to 24 hours with agitation being applied throughout the course of the reaction. The resulting product will comprise an aqueous suspension of homo-or copolymers which will be in the form of particulate solids having a resin solids content in the range of from about 5 to 60%, by weight. These polymer particles will have a particle size in the range of from about 2 to 500 microns with a range of from about 50 to 250 microns being preferred when these polymers are to be used as additives for preparing flame retardant thermoplastic polymers. The product of this step would ordinarily contain from about 15 to 30% by weight of unreacted, residual vinylphosphonate if it were for the process of the present invention.

In preparing these polymers by means of an emulsion polymerization procedure, the selected monomer or monomers, described above, are in an aqueous medium containing from about 0.03 to 10%, by weight of the monomer charge, and one or more anionic, non-ionic or cationic emulsifiers such, for example, as the alkyl carboxylic acid salts, the alkyl sulfate salts, the alkyl sulfonate salts, the alkyl phosphate salts, the alkyl sulfosuccinate salts, the alkyl aryl ether alcohols and the alkyl aryl polyether sulfate salts. The aqueous monomer emulsion is then heated for about 5 to 24 hours at a temperature of from about 0° to 150°C. in the presence of from about 0.05 to 5%, by weight of the monomer charge, of a water soluble free radical initiating catalyst such, for example, as ammonium, sodium or potassium persulfate, hydrogen peroxide or a redox system comprising a mixture of a persulfate with an alkali metal bisulfite, thiosulfate or hydrosulfite.

In preparing the homo-or copolymers of this invention by means of a solution polymerization procedure, the monomer charge in the basic polymerization recipe is first dissolved in an organic solvent such as, for example, a polyol, such as those listed in U.S. Pat. No. 3,330,782, benzene, toluene,, cyclohexanone, acetone, tetrahydrofuran, trichloroethylene, dimethylformamide or dimethylsulfoxide. When polyols are used as the solvent, a crosslinking monomer should not be used as a component in the polymerization recipe. The resulting solution is then heated for from about 5 to 24 hours at a temperature of from about 20° to 120°C. in the presence of about 0.05 to 5% of a monomer soluble azo or peroxide catalyst as exemplified by the catalysts listed hereinabove, in describing the suspension polymerization process.

Specific monomer compositions for the basic polymerization are: bis(beta-chloroethyl) vinylphosphonate, vinyl chloride and allyl methacrylate; bis (beta-chloroethyl) vinylphosphonate, styrene and allyl methacrylate, bis(beta-chloroethyl) vinylphosphonate, ethylene glycol dimethacrylate and vinyl bromide; and, bis(beta-chloroethyl) vinylphosphonate, allyl methacrylate and vinylidene chloride.

After the basic polymerization has reached a % conversion of about 40% or greater, preferably after the % conversion is over 80%, at least one monomer containing one ethylenically unsaturated group is added as a "chaser to polymerize with the unreacted vinylphosphonate monomer and thereby give a product which is substantially free of residual unreacted vinylphosphonate. The monomer used for a chaser is selected from the group consisting of the vinyl and vinylidene chlorides and bromides and the $C_1$–$C_{20}$ dialkyl esters, preferably the $C_1$–$C_{12}$ dialkyl esters, of fumaric and maleic acids. A particularly preferred chaser is vinyl chloride which is inexpensive and which adds chlorine to the final product thereby conferring additional flame retardance on the product. Vinyl chloride gives higher conversion values than the other chaser monomers listed above. The amount of chaser monomer which is added should range from about 10–30 weight %, based on the weight of the monomer charge initially in the polymerization medium. The preferred amount is about 20% by weight.

The invention is further illustrated by using the following Examples.

EXAMPLE 1

A bottle was charged with 90 grams of bis (beta-chloroethyl) vinylphosphonate, 5 grams of ethylene glycol dimethacrylate, 1.2 grams of benzoyl peroxide, 30 g. of Methocel 1242 (1% sol.) suspending agent, and 270 g. of deionized, distilled water. The suspension medium was agitated at 40 rpm and was held at 80°C. for 8 hours. After completion of the reaction, the bottle was vented and the product was collected. After drying in air to constant weight, it was not a dry solid powder, but rather a wet polymeric mass containing extensive amounts of unreacted bis (beta-chloroethyl) vinylphosphonate.

EXAMPLE 2

The process set forth in Example 1 was repeated with the exception that an additional 10 grams of ethylene glycol dimethacrylate and 0.8 gram of benzoyl peroxide were used and the reaction was allowed to run for an additional 8 hours. Upon completion of the reaction a product similar to the product in Example 1 was obtained again indicating low conversion of the bis(-beta-chloroethyl) vinylphosphonate.

At this point 30 grams of vinyl chloride chaser and 1 gram of diisopropyl peroxydicarbonate initiator were added to the bottle and the polymerization was resumed at 50°C. and 40 rpm for 8 hours. The bottle was vented and a dry free flowing powder was obtained which indicated that the powder was substantially free of unreacted vinylphosphonate.

What is claimed is:

1. In a process for forming a polymer of a bis(hydrocarbyl) vinylphosphonate comprising the steps of forming a polymerization medium containing a bis(hydrocarbyl) vinyl phosphonate monomer and polymerizing saiad monomer, wherein the improvement comprises adding a monoethylenically unsaturated monomer selected from the group consisting of the vinyl and vinylidene chlorides and bromides to the polymerization medium only when the percent conversion of monomer therein is 40% or greater and residual unreacted vinylphosphonate monomer remains.

2. A process as claimed in claim 1 wherein the amount of monoethylenically unsaturated monomer which is added to the polymerization medium ranges between about 10-30% by weight of the monomer charge that is initially in the polymerization medium.

3. A process as claimed in claim 1 wherein the monoethylenically unsaturated monomer is selected from the group consisting of vinyl chloride and vinyl bromide.

4. A process as claimed in claim 1 wherein the monoethylenically unsaturated monomer is vinyl chloride.

5. A process as claimed in claim 4 wherein the amount of vinyl chloride which is added to the polymerization medium ranges between about 10-30% by weight of the monomer charge initially in the polymerization medium.

6. A process as claimed in claim 1 wherein the amount of monoethylenically unsaturated compound which is added to the polymerization medium is about 20% by weight of the monomer charge initially in the polymerization medium.

7. A process as claimed in claim 1 wherein the polymerization medium comprises about 3-98% by weight of vinylphosphonate and from about 2-60% of crosslinking monomer.

8. A process as claimed in claim 7 wherein the polymerization medium further comprises up to 90% by weight of a monoethylenically unsaturated monomer.

9. A process as claimed in claim 1 wherein the polymerization is conducted in aqueous suspension.

10. A process as claimed in claim 1 wherein the polymerization is conducted in aqueous emulsion.

11. A process as claimed in claim 1 wherein the polymerization is conducted in an organic solvent medium.

12. A process as claimed in claim 11 wherein the organic solvent is a polyol.

13. The copolymer formed by the process of claim 1.

14. The copolymer formed by the process of claim 2.

15. The copolymer formed by the process of claim 5.

* * * * *

UNITED STATES PATENT AND TRADEMARK OFFICE
CERTIFICATE OF CORRECTION

PATENT NO. : 3,993,715
DATED : November 23, 1976
INVENTOR(S) : Jesse C. H. Hwa et al.

It is certified that error appears in the above-identified patent and that said Letters Patent are hereby corrected as shown below:

Col. 1, lines 42-57,

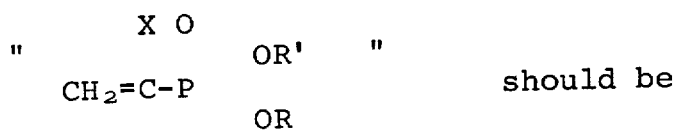   should be

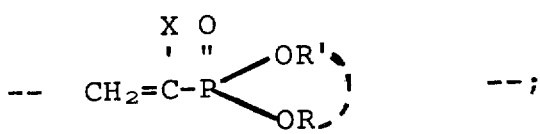   --;

Col. 1, lines 52-55,

   should be

   --;

Col. 2, line 12, "grups" should be -- groups --;

Col. 3, line 2, "acis" should be -- acid --;

Col. 3, line 11, "anad" should be -- and --;

Col. 3, line 55, -- not -- should appear after "were";

UNITED STATES PATENT AND TRADEMARK OFFICE
CERTIFICATE OF CORRECTION

PATENT NO. : 3,993,715
DATED : November 23, 1976
INVENTOR(S) : Jesse C. H. Hwa et al.

It is certified that error appears in the above—identified patent and that said Letters Patent are hereby corrected as shown below:

Col. 4, line 36, a second set of quotation marks should appear after "'chaser"; and Col. 5, line 23, "saiad" should be -- said --.

Signed and Sealed this fifth Day of July 1977

[SEAL]

Attest:

RUTH C. MASON
Attesting Officer

C. MARSHALL DANN
Commissioner of Patents and Trademarks